(12) United States Patent
Loos

(10) Patent No.: US 11,780,367 B2
(45) Date of Patent: Oct. 10, 2023

(54) DECORATIVE COMPONENT

(71) Applicant: Dr. Ing. h.c. F. Porsche Aktiengesellschaft, Stuttgart (DE)

(72) Inventor: Johannes Loos, Backnang (DE)

(*) Notice: Subject to any disclaimer, the term of this patent is extended or adjusted under 35 U.S.C. 154(b) by 442 days.

(21) Appl. No.: 17/079,569

(22) Filed: Oct. 26, 2020

(65) Prior Publication Data

US 2021/0122303 A1    Apr. 29, 2021

(30) Foreign Application Priority Data

Oct. 28, 2019   (DE) ...................... 10 2019 129 000.7

(51) Int. Cl.
| | |
|---|---|
| *B60R 13/02* | (2006.01) |
| *B60Q 3/60* | (2017.01) |
| *B60Q 3/64* | (2017.01) |
| *B60Q 3/225* | (2017.01) |
| *B60Q 3/217* | (2017.01) |

(52) U.S. Cl.
CPC .......... *B60R 13/0262* (2013.01); *B60Q 3/217* (2017.02); *B60Q 3/225* (2017.02); *B60Q 3/60* (2017.02); *B60R 13/0243* (2013.01)

(58) Field of Classification Search
CPC ......... B60Q 3/60; B60Q 13/0262; B60Q 3/64
See application file for complete search history.

(56) References Cited

U.S. PATENT DOCUMENTS

| | | | |
|---|---|---|---|
| 2016/0280128 A1* | 9/2016 | Cannon | ................. B60Q 3/225 |
| 2019/0307116 A1 | 10/2019 | Arnold et al. | |
| 2020/0346431 A1 | 11/2020 | Juenemann et al. | |

FOREIGN PATENT DOCUMENTS

| | | |
|---|---|---|
| DE | 202015104236 U1 | 8/2015 |
| DE | 102015104299 A1 | 9/2016 |
| EP | 1262827 A1 | 12/2002 |
| FR | 2700500 A1 | 7/1994 |
| JP | H 1083135 A | 3/1998 |
| WO | WO 2018091320 A1 | 5/2018 |

* cited by examiner

*Primary Examiner* — Joseph L Williams
(74) *Attorney, Agent, or Firm* — LEYDIG, VOIT & MAYER, LTD.

(57) ABSTRACT

A decorative component for an interior space of a motor vehicle includes an at least translucent first layer. The first layer has at least one first light-refraction edge. The decorative component further includes an at least translucent further layer which is placed areally on a preceding layer, wherein the further layer has at least one further light-refraction edge. At least some of the light-refraction edges of successive layers are positioned laterally offset with respect to one another for the purpose of creating a visual three-dimensional depth effect.

12 Claims, 2 Drawing Sheets

DECORATIVE COMPONENT

CROSS REFERENCE TO RELATED APPLICATIONS

This application claims benefit to German Patent Application No. DE 10 2019 129 000.7, filed on Oct. 28, 2019, the entire disclosure of which is hereby incorporated by reference herein.

FIELD

The invention relates to a decorative component for an interior space of a motor vehicle, by which the interior space can be visually designed.

BACKGROUND

WO 2018/091320 A1 discloses a window pane which has protruding pattern elements on either side of the window, as a result of which it is possible for Moiré patterns to be created when the window pane is viewed.

There is a constant need to design an interior space of a motor vehicle in a visually appealing manner.

SUMMARY

In an embodiment, the present invention provides a decorative component for an interior space of a motor vehicle. The decorative component includes an at least translucent first layer. The first layer has at least one first light-refraction edge. The decorative component further includes an at least translucent further layer which is placed areally on a preceding layer, wherein the further layer has at least one further light-refraction edge. At least some of the light-refraction edges of successive layers are positioned laterally offset with respect to one another for the purpose of creating a visual three-dimensional depth effect.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
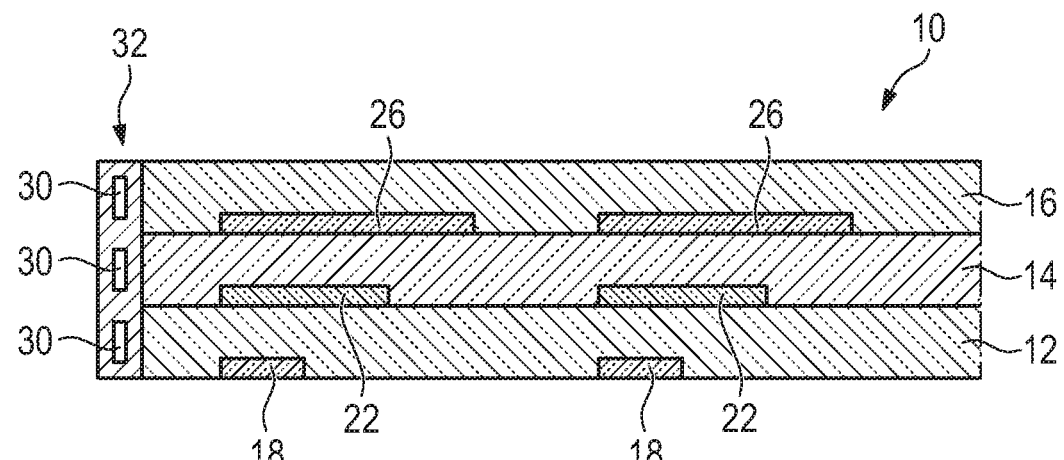
FIG. 1 shows a schematic sectional view of a decorative component.

The present disclosure describes measures which enable a visually appealing design of an interior space of a motor vehicle.

According to the disclosure, a decorative component for an interior space of a motor vehicle is provided, having an at least translucent first layer, wherein the first layer has at least one first light-refraction edge, and at least one at least translucent further layer which is placed areally on a preceding layer, wherein the further layer has at least one further light-refraction edge, wherein at least some of the light-refraction edges of successive layers are positioned laterally offset with respect to one another for the purpose of creating a visual three-dimensional depth effect.

The light-refraction edges create in particular linear regions in which the optical properties of the respective layer suddenly change. This change in the optical properties may be visible for a viewer by virtue of visual light effects at the respective light-refraction edge. The at least one light-refraction edge can form, for example in the manner of a script or a pattern, a visually perceptible representational element within the respective layer. Since the individual layers which have been placed one on top of another are of an at least translucent, preferably substantially transparent design, it is possible to perceive the visual effects of the light-refraction edges, provided one below another, in the individual layers. This leads to a visual impression of depth in the decorative component. In the plane of the respective layer, the light-refraction edges can bring about a two-dimensional representation, wherein by virtue of the interaction of the two-dimensional representations of the light-refraction edges of successive layers, there is a representation in the depth direction which leads to a visual three-dimensional depth effect. The light-refraction edges within a layer and light-refraction edges distributed over the layers which lie one on top of another may constitute or at least suggest a three-dimensional body. As a result, it is possible for the decorative element not only to visually constitute a two-dimensional surface which is curved in three-dimensional space, but also to achieve a three-dimensional representation by virtue of the visual three-dimensional depth effect. An exact arrangement of the light-refraction edges of the different layers one on top of another is however avoided and if need be provided in a partial region, with the result that an offset of the light-refraction edges is produced at least in a partial region. This offset leads to a three-dimensional impression of depth which is perceived as futuristic and appealing. The translucent layers which lie one on top of another and have light-refraction edges make it possible for a three-dimensional visual representation to occur in the decorative component, with the result that a visually appealing design of an interior space of a motor vehicle is made possible.

The respective layer has a large-area top side and a large-area bottom side which are connected to one another via narrow sides, it being possible for the at least one light-refraction edge to be provided between the top side and the bottom side in the material of the respective layer. The light-refraction edge may be created for example by introducing a material which is different than the rest of the material of the layer, the introduced material having different optical properties, in particular a different refraction index, than the rest of the material. The respective layer is preferably formed in one piece, the light-refraction edge being created by a local change in the optical properties that has been introduced in the one-piece material. The light-refraction edge is created for example by a fracture of the material, such that a continuous profile of the material on the fracture edge, which forms the light-refraction edge as a result, is interrupted. In addition or alternatively, the fracture edge may be created by a stamped indentation, engraving or some other non-cutting or material-removing process, with the result that a gap with a thickness of greater than zero is produced. The gap makes it possible to produce two light-refraction edges which lie close to one another and are separated from one another by way of the gap which in particular is filled with air as a visual medium. This leads to a particularly clearly visible line within the material of the respective layer. It is also possible to create the light-refraction edge by a local chemical modification, for example by etching, and/or a chemical reaction to form a material with different chemical and/or optical properties. The light-refraction edge is preferably created by a local introduction of heat, wherein the introduction of heat, created in particular by a laser, has led to a local thermal expansion of the material, with the result that the optical density of the heated material has changed. In addition or alternatively, the introduction of heat may also have led to a burning of the material, as a result of which it is possible to create a clearly visible light-refraction edge.

The decorative component may in particular be in the form of a display and/or touchscreen and/or a partial region of the decorative component may be in the form of a display and/or touchscreen, wherein in particular said partial region is formed free of light-refraction edges. In particular, it is possible to provide a display element for a display below the translucent or even transparent layers. In particular, the decorative component has several layers, for example three, four, five, six, seven or more layers, such that the three-dimensional depth effect can be represented in a correspondingly intensive manner. All the layers preferably have at least one light-refraction edge. It is, however, also possible that individual layers do not have light-refraction edges; for example, in the case of particularly thin layers, to provide by virtue of interlayers without light-refraction edges a height distance of the light-refraction edges of the layers which are spaced apart from one another via the interlayer.

In particular, the respective light-refraction edge is formed by a jump in the refraction index in the material of the respective layer. The profile of the refraction index within the material of the respective layer may be substantially constant until the refraction index changes abruptly at the light-refraction edge. A gradual and/or gentle change in the refraction index is thereby avoided, with the result that a sharp change in the optical properties is produced within the layer. This leads to a visually particularly sharp representation of a symbol represented by the at least one light-refraction edge. A blurry representation is avoided, with the result that a correspondingly sharp three-dimensional depth effect is produced.

The respective light-refraction edge is preferably formed by an introduction of heat and/or introduction of pressure into the material of the respective layer. The material of the layer that is initially present in one piece with similar optical properties can be worked by pressure and/or heat in a locally narrowly delimited region, in particular to form a fine line, as a result, in such a way that the optical properties abruptly change only in this locally narrowly delimited region.

Particularly preferably, the plurality of light-refraction edges of the respective layer form a pattern, in particular a linear closed contour. The contour may constitute, for example, a closed frame. In particular, the contour is in the form of a circle, oval, closed polygon or regular n-gon. The contours of the respective layers that are arranged in particular at least partially one on top of another can thereby be perceived as parts of a represented tunnel, as a result of which the three-dimensional depth effect is intensified.

In particular, the patterns of the different layers are affine copies of one another. This makes it possible for the represented tunnel to be represented in a widening or reducing manner, as a result of which the thickness of the decorative component can be represented in a manner deviating from the actual thickness in the manner of an optical illusion. The three-dimensional depth of the tunnel and/or of the three-dimensional depth effect is improved as a result.

The patterns of the different layers are preferably positioned substantially flush one on top of another on one side in the direction of the surface normals of the layers. As a result, in particular a common side of the tunnel constituted by the contours of the respective layers is produced, as a result of which the three-dimensional depth effect of the tunnel is intensified.

The patterns in the respective layer are particularly preferably in the form of a surface pattern which repeats in at least one direction within the layer. The creation of the light-refraction edges, in particular the creation of the contours constituted by the light-refraction edges, can be easily automated as a result. In particular, the layers of the decorative component can be designed as cut-off parts of an endless material. By virtue of the repeating surface pattern, the three-dimensional depth effect can be provided over a large part of the decorative component, wherein the regularity of the pattern makes it possible to avoid a visual impression which is perceived as turbulent and to provide a representation which is perceived as particularly appealing.

In particular, the light-refraction edges are formed only over a part of the material thickness of the associated layer, wherein in particular the light-refraction edges of successive layers are spaced apart from one another. Direct contact of the light-refraction edges of successive layers is avoided as a result, such that the light-refraction edges of the successive layers are provided spaced apart from one another. This leads to a futuristic overall impression which makes it possible to intensify the three-dimensional depth effect.

At least one light element, in particular LED, is preferably optically coupled to one side of the layers for the lateral illumination of the layers. The lateral illumination of the layers makes it possible to optically couple light into each layer that passes through the at least translucent material of the layer. The light beams of this light may impinge on the at least one light-refraction edge within the layer, where the light beams are deflected. As a result, an optical refraction edge which can be perceived well through the material of the respective layer is produced. Here, the deflected light can radiate further through the material of the layer and impinge on further light-refraction edges, as a result of which, proceeding from a light source, several light-refraction edges can be visually accentuated in order to create the three-dimensional depth effect.

The disclosure also provides an interior lining part, in particular door interior lining for a door of a motor vehicle or central console, having a top side which bounds an interior space and a decorative component which is embedded into the top side and can be formed and developed as described above. The translucent layers which lie one on top of another and have light-refraction edges make it possible for a three-dimensional visual representation to occur in the decorative component, with the result that a visually appealing design of an interior space of a motor vehicle is made possible.

The decorative element 10 illustrated in FIG. 1 for an interior space of a motor vehicle has, for the purpose of simplified illustration, for example a first layer 12, a second layer 14 and a third layer 16, which are stacked one on top of another and in particular are connected to one another. The layers 12, 14, 16 may in particular be produced from an identical material which is preferably as transparent as possible, for example glass and/or synthetic glass. With respect to the second layer 14, the first layer 12 is a preceding layer, while the second layer 14 is a further layer. With respect to the third layer 16, the second layer 14 is the preceding layer, while the third layer 16 is the further layer. For further layers, this correspondingly applies analogously. Introduced on the bottom side of the first layer 12 over part of the material thickness of the first layer 12 by lasering is a first light-refraction edge 18 which is part of a repeating first pattern 20. Correspondingly, on its bottom side, the second layer 14 has second light-refraction edges 22 which are part of a repeating second pattern 24, while, on its bottom side, the third layer 16 has third light-refraction edges 26 which are part of a repeating third pattern 28.

Figure 2:
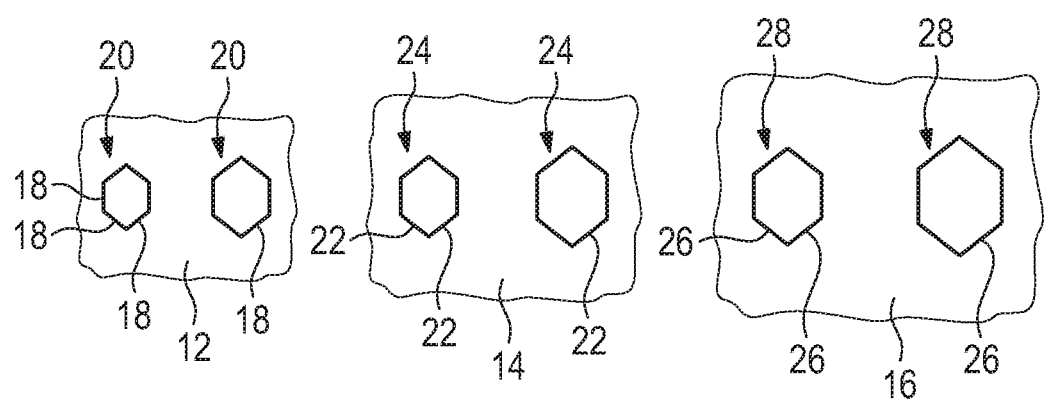
FIG. 2 shows a schematic plan view of different layers of the decorative component from FIG. 1.

As illustrated in FIG. 2, the patterns 20, 24, 28 can be affine copies of one another, the size of which changes proportionally over the layers 12, 14, 16. As illustrated in FIG. 1, the patterns 20, 24, 28 can be arranged flush one on top of another on one side, wherein the extent of the light-refraction edges 18, 22, 26 and the associated patterns 20, 24, 26 are formed laterally offset with respect to one another on the other side, in order to intensify the three-dimensional depth effect. The layers 12, 14, 16 can be illuminated on at least one side by a light element 32 having, for example, a plurality of LEDs 30, with the result that the light-refraction edges 18, 22, 16 can be visually emphasized, in particular optionally by virtue of the light element 32 being deliberately switched on and/or switched off.

Figure 3:
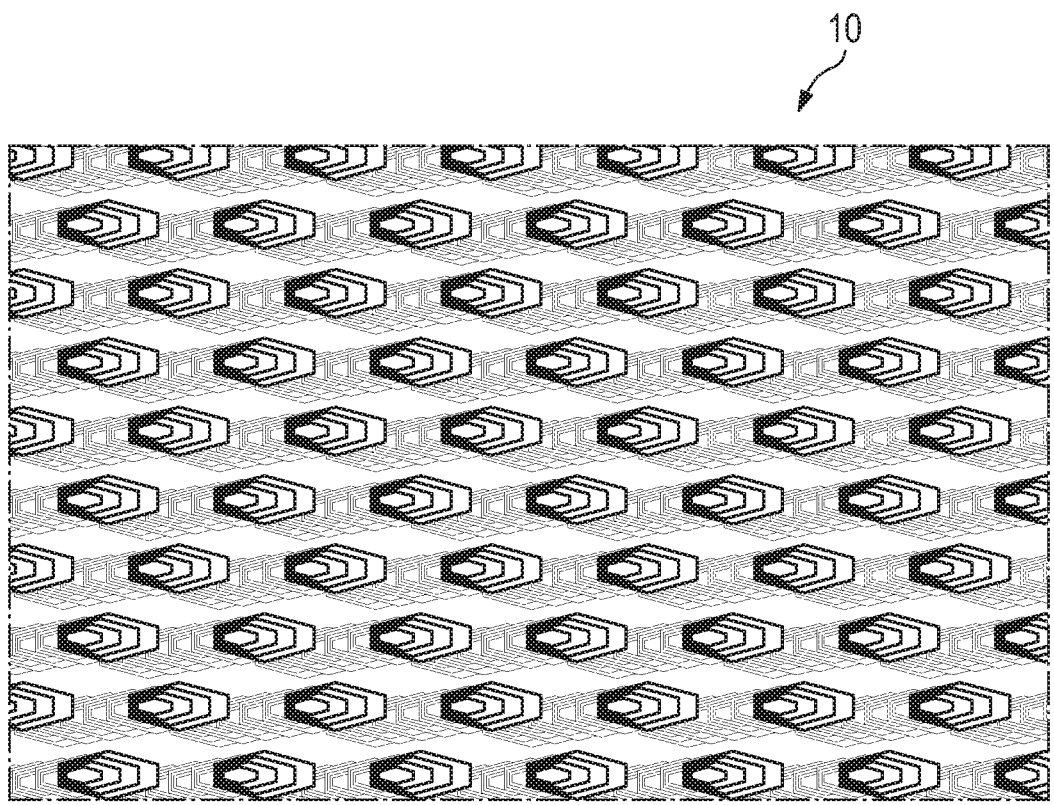
FIG. 3 shows a schematic perspective view of the decorative component from FIG. 1 that has been designed for example with five or more layers.

As illustrated in FIG. 3, the patterns 20, 24, 28 which have been arranged one on top of another may be represented as parts of a tunnel, as a result of which a visually appealing three-dimensional depth effect is produced. As a departure from the illustration in FIG. 1, the decorative element 10 illustrated in FIG. 3 has not just three layers 12, 14, 16, but five or more layers, in order to intensify the three-dimensional depth effect.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A decorative component for an interior space of a motor vehicle, the decorative component comprising:
   an at least translucent first layer, wherein the first layer has at least one first light-refraction edge, and
   an at least translucent further layer which is placed areally on a preceding layer, wherein the further layer has at least one further light-refraction edge,
   wherein at least some of the light-refraction edges of successive layers, by being positioned laterally offset with respect to one another, are configured to create a visual three-dimensional depth effect.

2. The decorative component as claimed in claim 1, wherein a respective light-refraction edge is formed by a jump in the refraction index in the material of the respective layer.

3. The decorative component as claimed in claim 1, wherein the respective light-refraction edge is formed by an introduction of heat and/or introduction of pressure into the material of the respective layer.

4. The decorative component as claimed in claim 1, wherein the plurality of light-refraction edges of the respective layer form a linear closed contour.

5. The decorative component as claimed in claim 4, wherein patterns of the different layers are affine copies of one another.

6. The decorative component as claimed in claim 4, wherein the patterns of the different layers are positioned substantially flush one on top of another on one side in the direction of the surface normals of the layers.

7. The decorative component as claimed in claim 4, wherein the patterns in the respective layer are in the form of a surface pattern which repeats in at least one direction within the layer.

8. The decorative component as claimed in claim 1, wherein the light-refraction edges are formed only over a part of a material thickness of an associated layer, wherein in particular the light-refraction edges of successive layers are spaced apart from one another.

9. The decorative component as claimed in claim 1, wherein at least one light element is optically coupled to one side of the layers for the lateral illumination of the layers.

10. An interior lining for a door of a motor vehicle or central console, comprising:
    a top side which bounds an interior space; and
    a decorative component as claimed in claim 1 which is embedded into the top side.

11. The decorative component as claimed in claim 1, wherein the light-refraction edge of each successive layer overlaps and extends past the light-refraction edge of each immediately preceding layer, and wherein each light-refraction edge shares a common refraction index.

12. The decorative component as claimed in claim 1, wherein the light-refraction edge of each successive layer is configured to refract light into an individual two-dimensional representation which is overlaid with the two-dimensional representation of each successive layer.

* * * * *